United States Patent
Gaddini et al.

(10) Patent No.: US 8,636,476 B2
(45) Date of Patent: Jan. 28, 2014

(54) FEEDING SYSTEM FOR AN INDUCTIVE LOAD FROM AN ENERGY SOURCE WITH VARIABLE POWER

(75) Inventors: Hermes Gaddini, Pirituba (BR); Marco Aurelio Gimenez, Santo André (BR); Aurélio Antonio Pastori, Jundiaí (BR)

(73) Assignee: Industria de Motores Anauger S.A., Itupeva, SP (BR)

( * ) Notice: Subject to any disclaimer, the term of this patent is extended or adjusted under 35 U.S.C. 154(b) by 282 days.

(21) Appl. No.: 12/794,119

(22) Filed: Jun. 4, 2010

(65) Prior Publication Data

US 2011/0080759 A1 Apr. 7, 2011

(30) Foreign Application Priority Data

Jun. 5, 2009 (BR) .................................. 0903548

(51) Int. Cl.
- *F04B 49/06* (2006.01)
- *F04B 17/03* (2006.01)
- *H02M 7/5383* (2007.01)

(52) U.S. Cl.
USPC ........................... 417/44.11; 417/411; 363/74

(58) Field of Classification Search
USPC .................... 417/44.1, 44.11, 411; 363/50, 74
See application file for complete search history.

(56) References Cited

U.S. PATENT DOCUMENTS

| | | | | |
|---|---|---|---|---|
| 4,483,319 A | * | 11/1984 | Dinh | 126/646 |
| 4,573,004 A | * | 2/1986 | Herve | 320/137 |
| 5,748,459 A | * | 5/1998 | Yamada et al. | 363/56.03 |
| 6,611,441 B2 | * | 8/2003 | Kurokami et al. | 363/56.02 |
| 7,079,406 B2 | * | 7/2006 | Kurokami et al. | 363/56.03 |
| 8,044,533 B2 | * | 10/2011 | Schill | 307/39 |
| 8,154,893 B2 | * | 4/2012 | Iwata et al. | 363/98 |
| 2005/0286281 A1 | * | 12/2005 | Victor et al. | 363/131 |
| 2010/0020576 A1 | * | 1/2010 | Falk | 363/55 |
| 2010/0277218 A1 | * | 11/2010 | Schill | 327/427 |
| 2012/0001491 A1 | * | 1/2012 | Cramer et al. | 307/82 |
| 2012/0051110 A1 | * | 3/2012 | Yuan et al. | 363/131 |

* cited by examiner

*Primary Examiner* — Charles Freay
(74) *Attorney, Agent, or Firm* — Volpe and Koenig, P.C.

(57) ABSTRACT

A system is provided for the feeding of an inductive load, with electric power of continuous current, generated from an energy source and, more in particular, to a feeding system for a vibratory pump from solar or aeolic energy, which processes the electric power of continuous current supplied by a bank of solar cells or aeolic generator, in a compatible form, using a circuit of electronic command by digital micro controller, for the control and actuation of vibratory pump, independent of the electric power variations supplied by the sources as solar cells, due to the alterations in the level of solar radiation; or in aeolic generator, due to wind speed variations.

13 Claims, 8 Drawing Sheets

FEEDING SYSTEM FOR AN INDUCTIVE LOAD FROM AN ENERGY SOURCE WITH VARIABLE POWER

FIELD OF THE INVENTION

The present invention refers to a system for feeding of an inductive load starting from an energy source whose net power varies regarding time.

Preferably, the present invention refers to a vibratory pump with electric power feeding of continuous current, generated by a bank of solar cells or an aeolic generator. More in particular, a feeding system for a vibratory pump starting from solar or aeolic energy is described, which processes the electric energy of continuous current supplied by the bank of solar cells or aeolic generator, in compatible form, using an electronic circuit of command by digital micro-controller, for the control and the activation of the vibratory pump, independent of electric power variations supplied by the source, due to the alterations in the level of solar radiation or due to wind speed variations.

BACKGROUND

It is known that the systems that use pumps activated from a motor of continuous current have the need to generate a minimum power for their operation. In particular, the larger the system hydraulics pressure, the larger the need of energy for the motor to reach a minimum rotation. In a normal application, the energy fluctuations, in function of the natural variables of solar radiation or wind speed, they make the system suffers continuous paralyzations (periods of low level of solar radiation or of wind). To eliminate or to reduce such effects, they usually employ great quantities of solar cells or larger aeolic power generation, which increases the systems implantation cost. Another solution to overcome the above drawbacks is the use of banks of supplemental batteries that store energy during periods of low energy and transfer to the pump in order to provide enough energy for activation. However, the cost involved with this solution makes it completely unfeasible.

Actuation systems of electromechanical pumps are also known. They process the electrical power only supplied by the solar cells, and convert the energy in variables pulses and spaced regarding the level of solar radiation. These systems operate in analogous form, where the circuit signals are treated in direct form, not allowing attending to the variables to which the system is subject, without alterations in the electronic project; this carries circuit costs increase, it limits the system input power, does not allow the use of higher performance pumps and does not allow its use in aeolic generators, due to the high power supplied by these devices. The use of such techniques reduces the system revenue, increasing the installed power cost of solar cells by pumped liter. Further, the protection means for the circuit are onerous and inefficient, operating only with independent systems. An example of such a system is described in Brazilian patent PI 8204205, deposited on Jul. 16, 1982.

SUMMARY OF THE INVENTION

Thus, it constitutes a first goal of the present invention, to supply a feeding system for an inductive load from an energy source with a variable net power, able to control the power supplied for the inductive load, as well as accommodate it to the needs of the inductive load.

Even more, it constitutes another goal of the present invention to supply a feeding system for a vibratory pump, from a bank of solar cells or aeolic generator, able to solve the aforementioned problems.

In particular, the present invention describes a feeding system for an inductive load, from an energy source with variable power, from the conversion in pulses of constant energy and spaced regarding the net power supplied by the energy source (2) and without batteries use. The conversion is made by a bridge circuit, controlled by a digital micro controller in function of system variables. Beyond of this, the feeding of the inductive load is made through a resonant RCL series circuit, in which the inductive component is the inductive load itself. The interface between the energy source and the inductive load is accomplished by an actuation module, which comprehends: a capacitors bank, fed by the energy source; a circuit bridge between the said capacitors bank and a key; a digital micro controller, destined to control the circuit bridge, with basis in the system variables; and a resonant RCL series circuit, comprising a resistance, a capacitor and the said inductive load, destined to feed the inductive load itself.

In other words, the system consists in transforming the electric power of continuous current generated by the source, in alternating current with the biggest possible efficiency, from the conversion in pulses of constant energy and spaced regarding the net power supplied by the energy source and without using batteries, allowing low maintenance and with the possibility to use a larger power of electric generation, with the consequent improvement in the performance of the inductive load. Due to the application of a digital micro controller to the electronic circuit, the technical solution allows several configuration setups without alteration of the electronic project, because it improves the operation parameters in function of system variables (capacitor load timing, source voltage level and current in the inductive load). The digital micro controller also provides protection to the system in dependent form with introduction of a mosfet-type (field effect transistor) switch, of low energy loss that turns off totally the energy for the "SCR" (solid state key).

BRIEF DESCRIPTION OF THE DRAWINGS

The present invention object will be better comprehended from the detailed description that follows in a way preferential of accomplishment, illustrating the invention system job in the activation of a vibratory pump starting from a bank of solar cells, which is made with support in the enclosed illustrations, in which.

DETAILED DESCRIPTION OF THE PREFERRED EMBODIMENTS

In a succinct form, the present invention concept is based on electric power transformation of continuous current generated by an energy source, in pulses, through a digital technique, that results in a larger control, with consequent low maintenance and system larger efficiency. The electric power conversion of continuous current supplied by the source is accomplished through a resonant RCL series circuit, which is formed by a capacitor (P6) associate to the coil of inductive load (P5).

For a better comprehension of the concepts that govern the present invention, described below is one of the possible forms of carrying out the invention, in which the energy source is represented by a bank of solar cells, while the inductive load is represented by a vibratory pump, this pump configured for the pumping of water. Nevertheless the illustrative scope and not limiting of this accomplishment, the experts in the art are going to realize that the concepts and the materialization of this system can be employed equally in other applications. For example, the energy source can comprise an Aeolic generator, whose net power varies regarding the wind speed, or can comprise a generator connected to a water wheel, whose net power varies regarding the water flux. Furthermore, the load to be fed by the system is an inductive load, just as, for example, a vibratory pump, among others.

Figure 1:
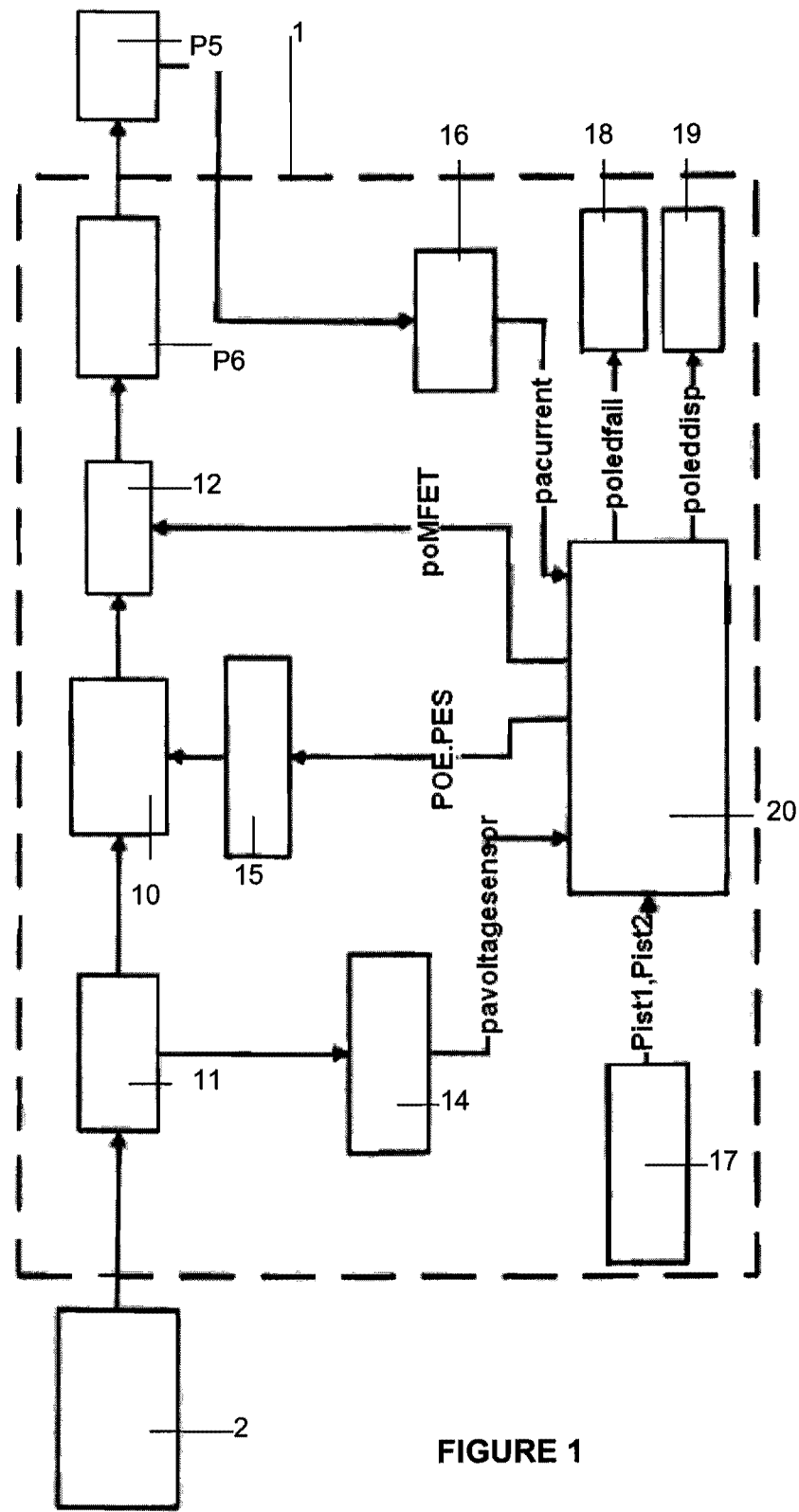
FIG. 1 illustrates a block diagram of an actuation system of the present invention, with highlight for the activation module of the vibratory pump.

FIG. 1 illustrates, in the form of a block diagram, the actuation system of a vibratory pump, according to the present invention. An actuation or activation module, indicated by 1, which is connected to the energy source 2 and the vibratory pump P5.

The said activation module 1 generally comprises a capacitor bank 11, a bridge circuit 10, a switch 12, a capacitor P6 and a digital micro controller 20, this last being responsible for the control of the whole energy transformation received from source 2 and of the feeding control supplied for the vibratory pump P5.

More particularly, the energy source input originating from the solar cells or aeolic generator 2 is driven to a capacitor bank 11, configured to store this energy and supply it to the bridge circuit 10. The capacitor bank 11 is connected to the digital micro controller 20 through a voltage sensor 14, configured to inform the digital micro controller 20 the voltages in said capacitor bank 11. The capacitor bank 11 has its output linked to the bridge circuit 10, which is controlled by digital micro controller 20 through actuators 15. The bridge circuit output 10 is linked to a key 12, composed by four switches of solid state or SCRs, which in turn has its output connected to capacitor P6 and its actuation connected to an output of digital micro controller 20. The vibratory pump P5 is fed through capacitor P6 (forming the RCL series circuit) and it presents a sensor of current 16 configured to inform to the digital micro controller 20 about the amount of current that traverses the inductive load (vibratory pump P5).

Finally, the digital micro controller 20 receives as inputs the signals coming from the voltage sensor 14 of capacitor bank 11, of the current sensor 16 of the vibratory pump P5 and of a delay selector 17. The controls made by digital micro controller 20 correspond to activation of actuators 15 of the bridge circuit 10, of the switch 12, as well as information supply of the control through the LED (light emitting diode) of fault 18 and of pulse LED 19.

In operation, the activation module 1 receives a certain quantity of energy originating from the source 2, stores such energy in the bank of capacitors 11 and transforms this energy (as it will be described in greater detail below) through the bridge circuit 10. This energy thus transformed is converted (in 12) in alternating current and supplied for the vibratory pump P5, through capacitor P6. All control of operation of actuation module 1 is accomplished by means of digital micro controller 20, according to the illustrated routines, for example purposes only and not limitative, through the illustrations flowcharts FIGS. 3A to 3F.

In other words, the actuation module 1 is a circuit able to supply alternating current to the inductive load (vibratory pump P5) employing the energy stored in the electric field of capacitors 11. The energy conversion occurs by means of the alternating of current sense, via bridge circuit 10, in resonant RCL series circuit, composed by capacitor P6 and inductive load (vibratory pump P5). The control of bridge circuit 10 is made by digital micro controller 20, based on a digital processor, as the information of the voltage sensor 14 and of the sensor of current 16, present in the circuit.

System Overview

Figure 2A:
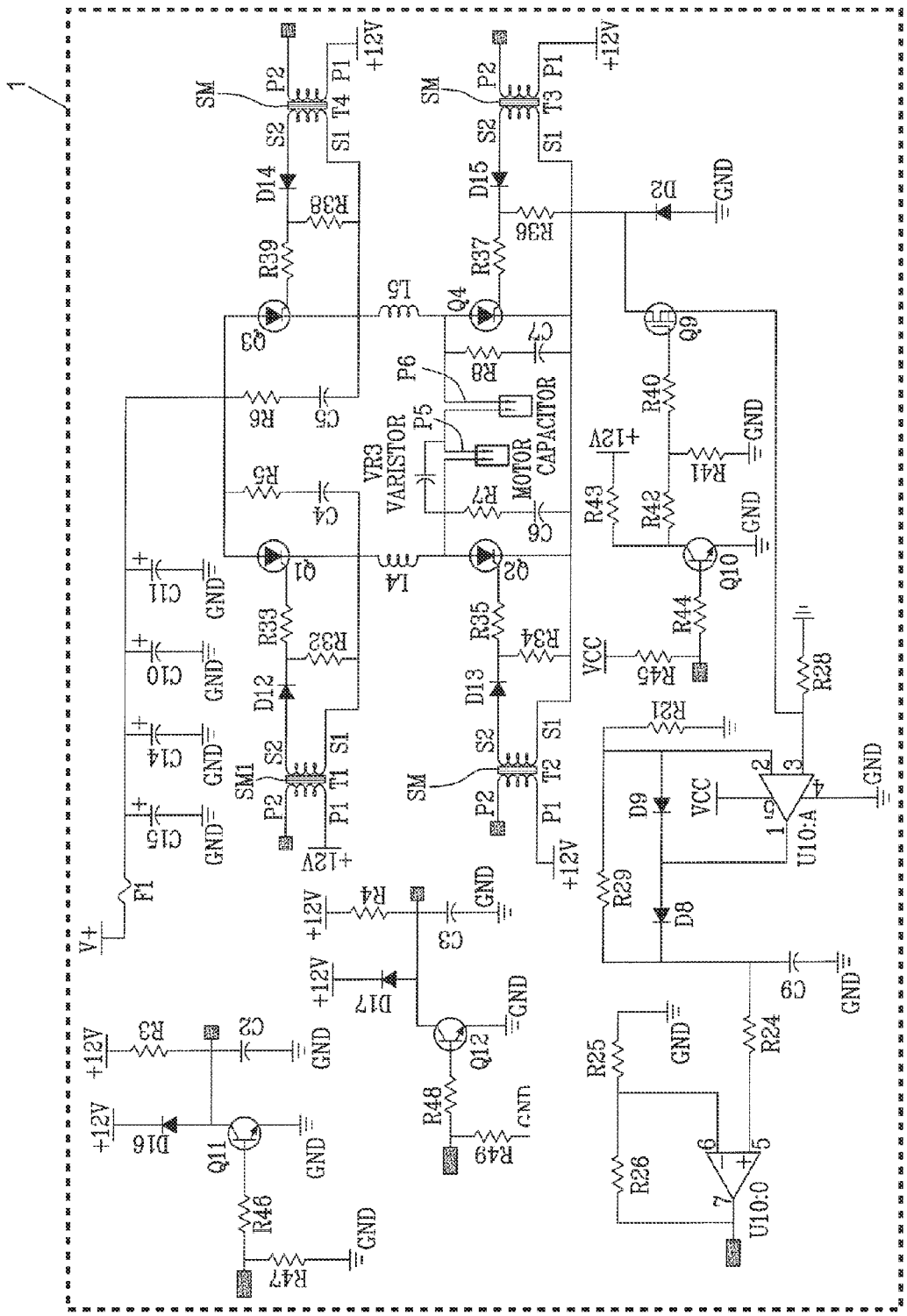
FIGS. 2A and 2B illustrate the circuit corresponding to the activation module, according to FIG. 1.
Figure 2B:
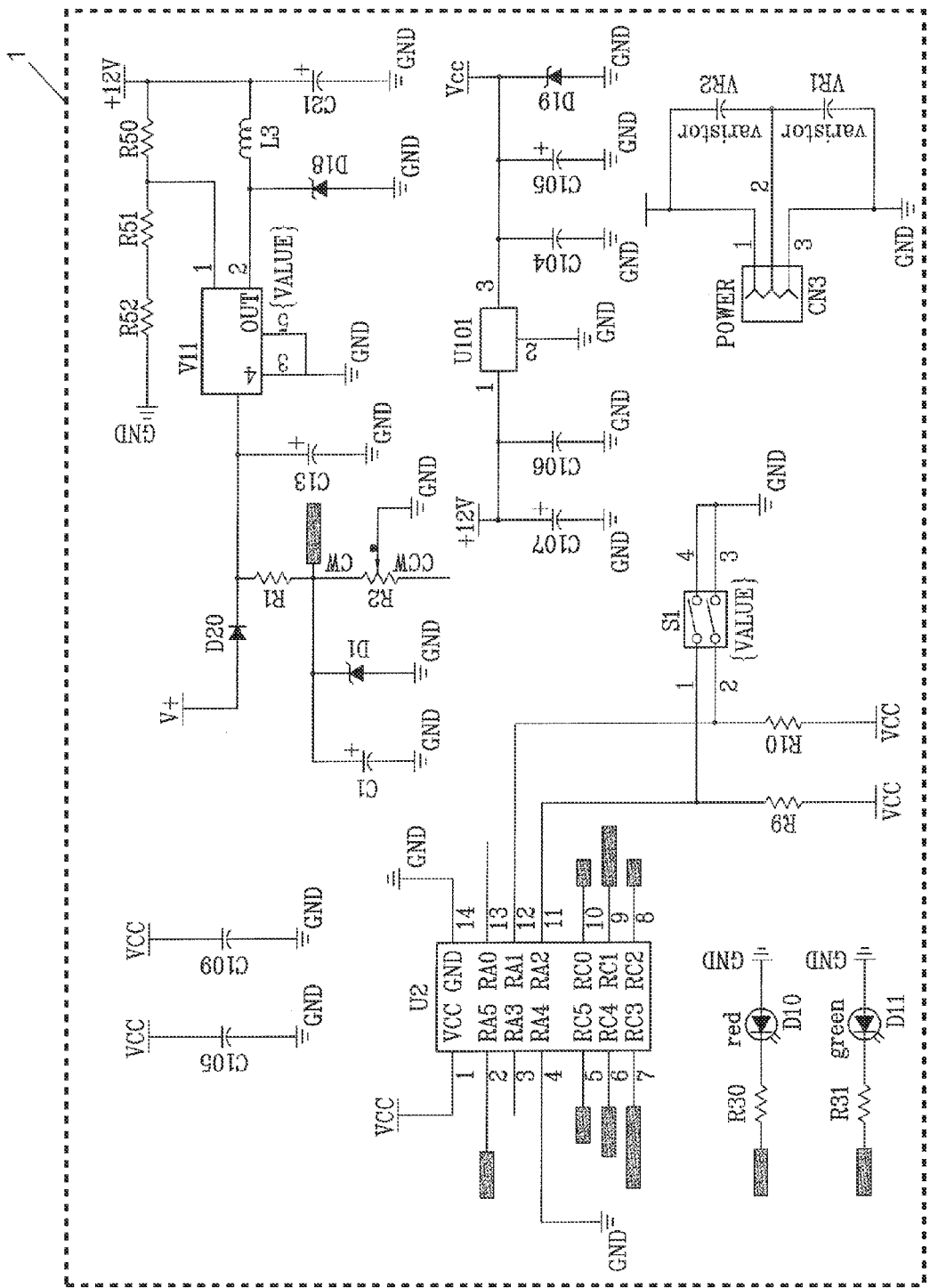
Figure 3A:
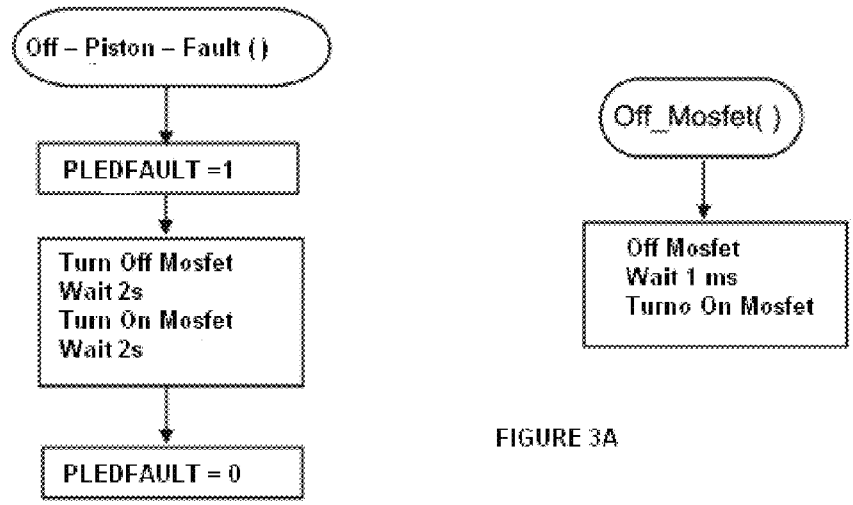
FIGS. 3A to 3F illustrate the flow chart of the control software of the activation module, according to FIG. 1.
Figure 3B:
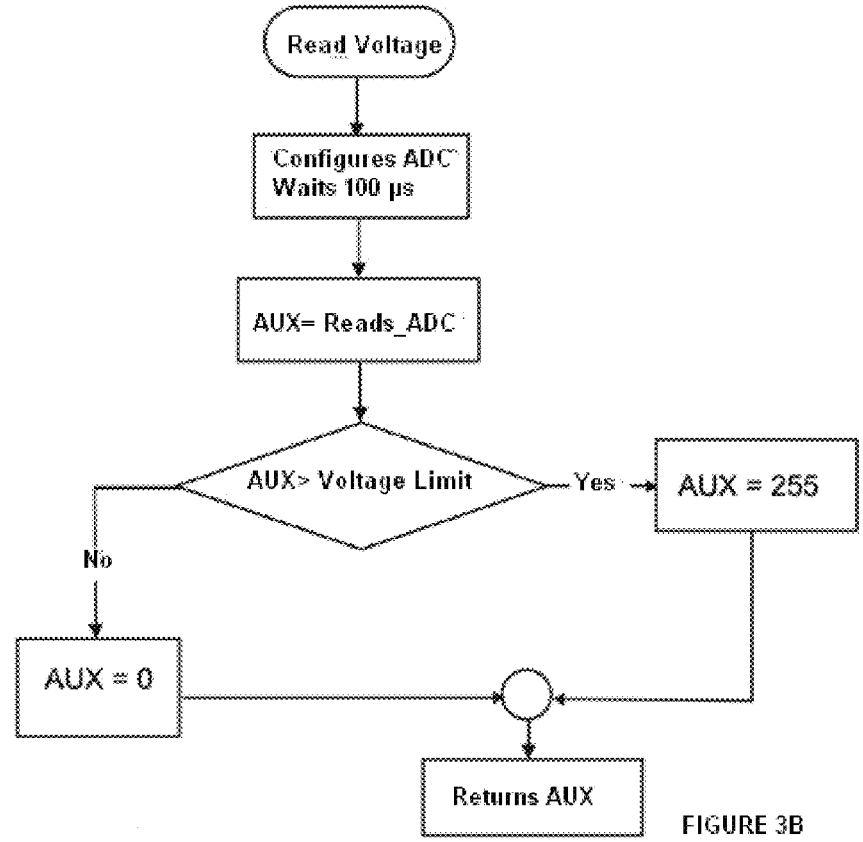
Figure 3C:
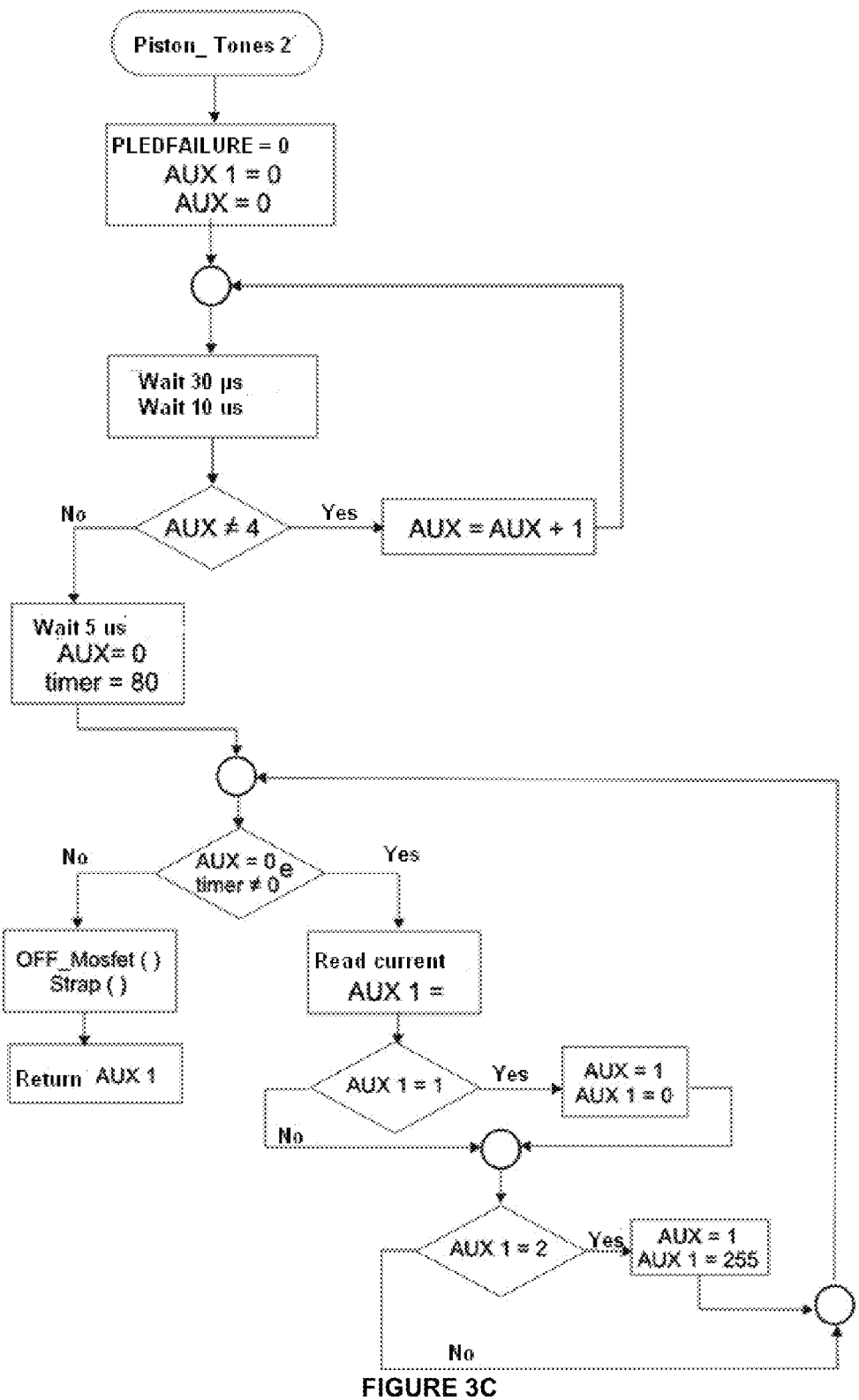
Figure 3D:
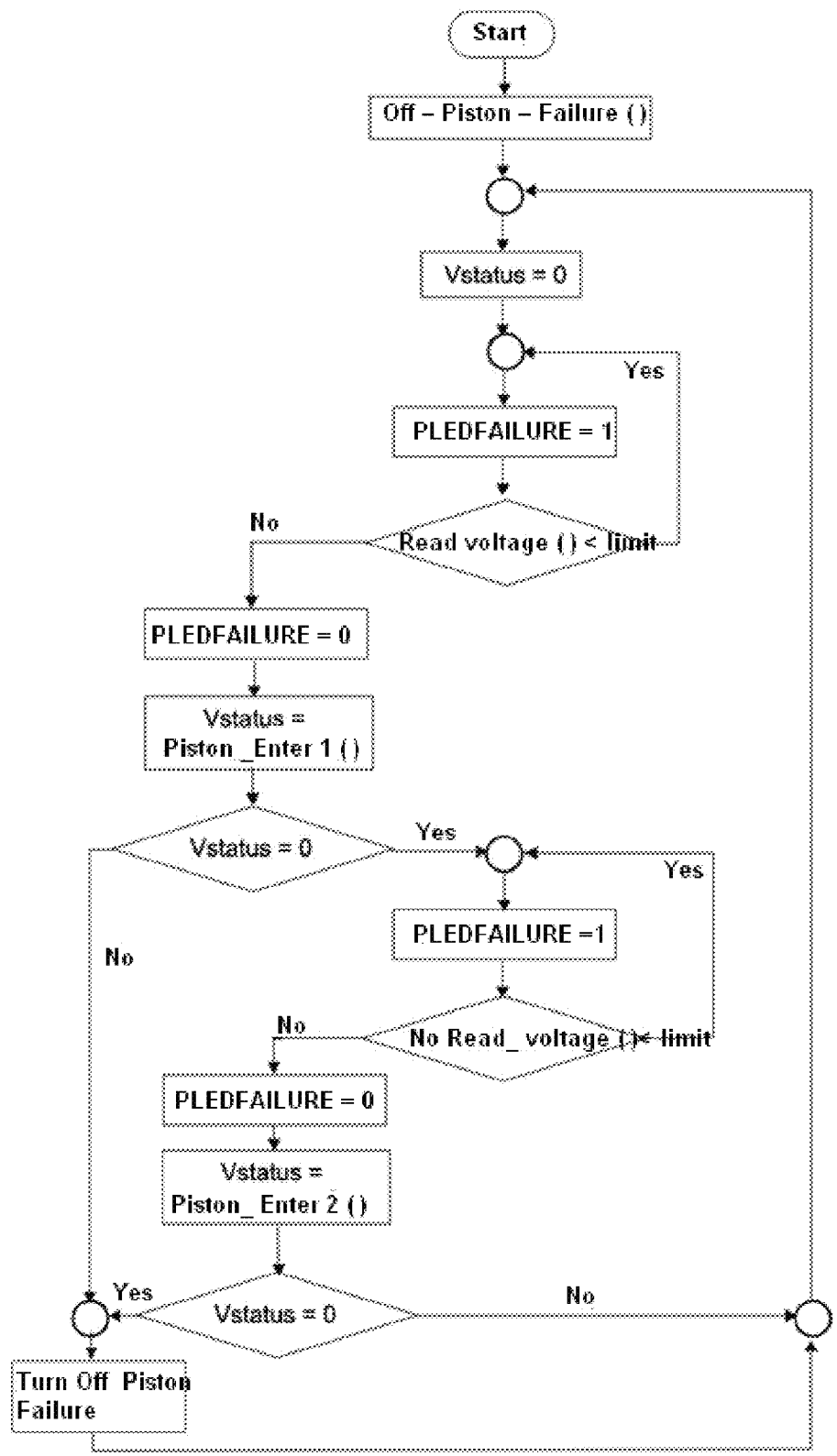
Figure 3E:
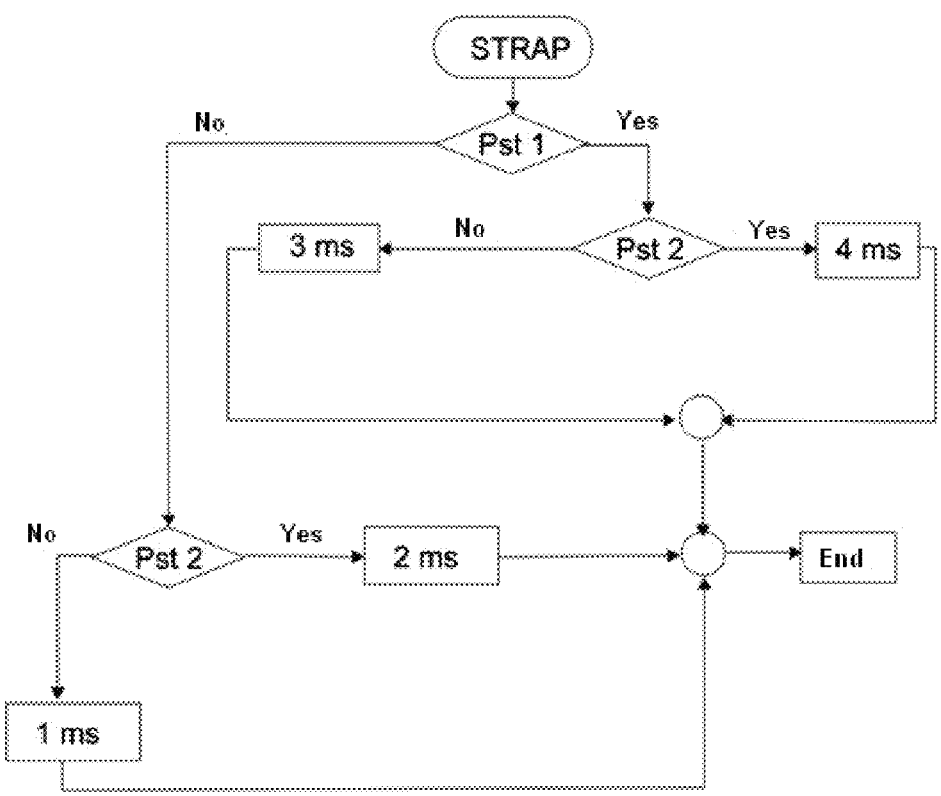
Figure 3F:
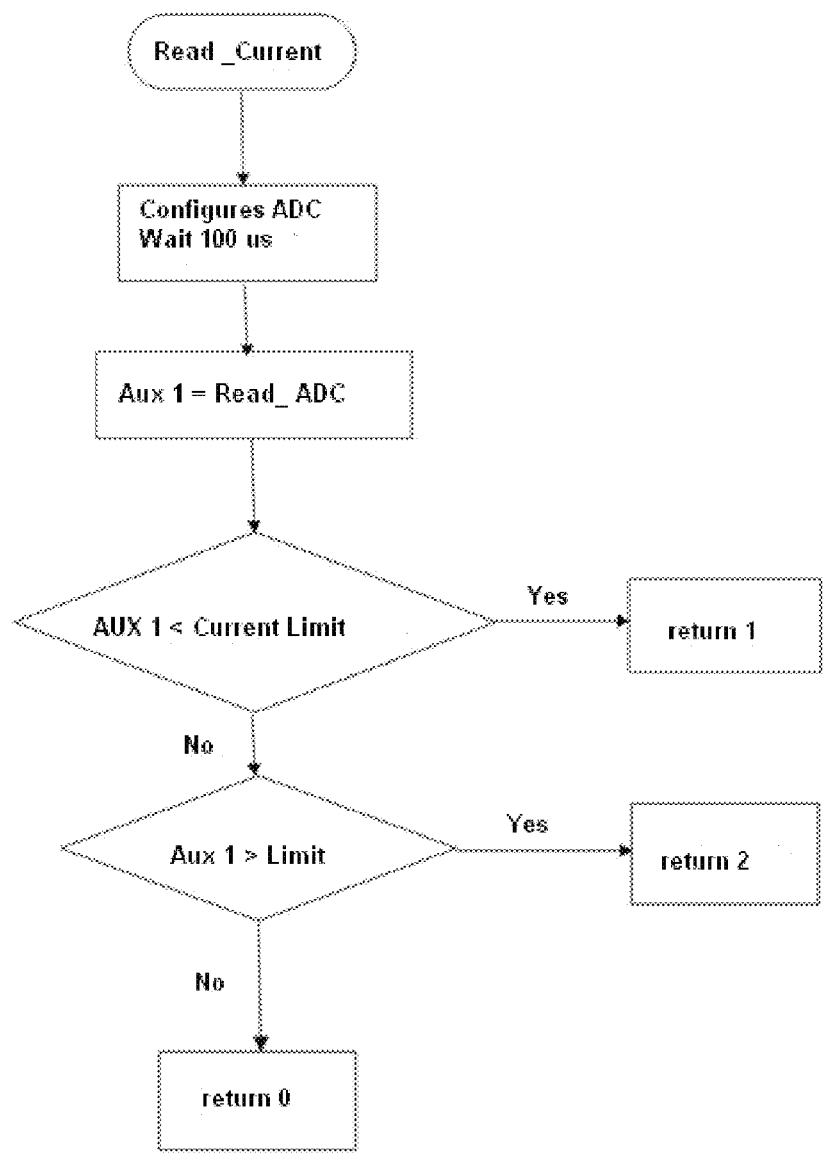

FIGS. 2A and 2B illustrate the circuit corresponding to the actuation module, according to the present invention.

The activation of the resonant RCL series circuit, composed by the capacitor (P6) and vibratory pump (P5) is given by the control of the presence and of the current sense via the circuit bridge.

For the bridge circuit command, the control system, implemented in digital micro controller (U2), evaluates the voltage level of the of energy storage capacitors (C14 and C15) of capacitors bank 11. This information originating from the voltage circuit sensor 14.

If the minimum level of voltage is detected, it is allowed that current circulate in just one of the two possible paths. It evaluates then the current amount that passes through the inductive load (vibratory pump P5). This information is originating of circuit sensor of current 16.

If the current is inside the programmed levels, repeat the described sequence, however the bridge circuit 10 is commuted so that the current flows in the opposite sense.

Before inverting the current sense open the electronic key (Q9) able to interrupt possible remaining currents in the inductive load (vibratory pump P5) and make timings, with pre-programmed durations by software.

The timings values are defined as electric characteristics of the resonant RCL series circuit.

During the timings it is prevented the current circulation by the inductive load (vibratory pump P5).

Bridge Circuit Description and Resonant RCL Series Circuit

The vibratory pump (P5), that is the load to be fed, with inductive characteristic, is in series with a capacitor (P6), resulting in a LC circuit. As it is known, such circuits have an angular frequency of resonance given by $$\omega_0 = \frac{1}{\sqrt{LC}}$$

If there were no losses, a stimulus in this circuit would provoke an oscillation of infinite duration, with frequency equal to the resonance. As there are losses, a stimulus can provoke an absorbed oscillation, that is, with decreasing amplitude along time. In this case, the oscillation frequency is a bit different from $\omega_0$.

In the module circuit, the vibratory pump (P5) and the capacitor (P6) meet in the central branch of bridge circuit 10 controlled by thyristors (Q1, Q2, Q3 and Q4).

The devices Q1, Q2, Q3 and Q4 are responsible for the current sense in the LC circuit, commutating a pair diagonally opposed each time (Q1 and Q4, Q3 and Q2).

With this and reminding that the voltage in the inductor is obtained by $$v_L(t) = L\frac{di(t)}{dt}$$

It is described, following, the alternate voltage obtainment about the inductor (vibratory pump P5).

At the moment in which the circuit is connected, the inductor and the capacitor are unloaded. Of the electric point of view the inductor is an open circuit and the capacitor is a short circuit.

Commuting only a pair of thyristors diagonally opposed (Q1 and Q4), a current will start to run the LC circuit.

However, in a first instant, as the inductor is an open circuit, the current is null (note: in this description, the starting current is not being considered).

Step by step, the inductor goes loading itself and storing energy in the form of magnetic field. With that the inductor impedance starts to decrease, allowing a current increase. Alternatively, the capacitor P6 also goes loading itself, when accumulating energy in form of electric field and, consequently, its impedance starts to increase. Then, summing the effect of inductor P5 and of capacitor P6, the resultant current is increasing just for a certain time interval, decreasing soon after.

Yet, the current when increasing, is increasing with decreasing rates of increment and, when decreasing, is decreasing with increasing rates of decrement. Because of this, when the current is increasing, a positive voltage will appear with decreasing amplitude along time (observe the derivative effect in the expression for $v_L(t)$), until the current stop to increasing.

At this point, the voltage is null, because the punctual derivative of the current is null. Soon after, when the current becomes decreasing, it has as result a negative voltage with amplitude, in module, increasing (again, observe the expression for $v_L(t)$). The current decreases until it becomes zero.

The time to current decrease depends on the characteristics of LC circuit and the associated losses.

The thyristors elements have characteristics to stop of conducting with null current or near to zero. In this instant, the current in the circuit is interrupted and has the capacitor P6 loaded with a certain voltage.

Some instants after the programmed timing in the control system activates only the other pair of thyristors diagonally opposite (Q3 and Q2).

The inductor can be considered open and the current increases little by little, as already described, however in the opposite direction of the previous.

The capacitor, in turn, starts to unload itself and, soon after, becomes loaded with an opposite voltage. This way, the current, again, will reach a maximum and will decrease until it becomes zero.

This will result in an alternate voltage in the inductor, as previously, but with an opposite value along time, regarding the previous case.

Again, when the current is null or near to zero, thyristors stop conducting, interrupting the current in the circuit.

Finally, after pre-programmed timing in the control system, it commutes again the first pair of thyristors, and the cycle repeats, reminding that the capacitor will be always loaded before the commutation, except for the instant in which the activation module circuit 1 is connected.

The energy supplied by the source 2 to the system generates a current that flows through the capacitor and starts to flow by the inductor P5. When the inductor tends to its purely ohmic resistance, the capacitor will tend to an infinite resistance, that will make the current reaches a value next to zero, at this moment the capacitor will have accumulated the maximum possible of energy.

When the current is near to zero a module formed by four SCRs which control the energy that will be generated for the vibratory pump P5, it will do the current sense inversion, and as the capacitor is energized it will comprise the sum of two voltages sources, one originating of the solar cells (source 2) and another of capacitors.

The SCR's control occurs through pulse transformers that isolate the discharges of electromagnetic interference for the remaining of the circuit.

To guarantee a better system performance, a capacitors bank 11 that accumulates energy originating of the solar cells 2 is provided, serving as auxiliary generator of energy, thus, the system operates with the minimum of solar radiation on the solar cells, in other words, low net power.

The advantages of this system regarding the other existing ones is that this owns a digital micro controller that optimizes its operation parameters in function of system variables: time of capacitor load, source of voltage level and system current level, what allows the use of a larger installed power of generation, improving the hydraulic performance of the vibratory pump. This digital micro controller 20 protects the system against eventual faults and allows for parameterization, making thus the adjustment more efficient the maximum performance curves of the vibratory pumps (pressure×flow).

As the system can work in places with few resources and operationally inhospitable, safety devices were introduced to attend the requisites programmed in digital micro controller, so that they return automatically in operation, in case the system presents a temporary failure. These devices are of two types: dependent on digital micro controller intervention and totally independent. For the dependent system a mosfet-type switch of low energy loss was introduced, that totally turns off the energy for the SCR. The independent system is constituted by a protection device of counter current, over current and current (fuse).

As said, FIGS. 3A to 3F illustrate the software flow chart control actuation module, in order to exemplify to a possible form of referred module 1. It should be highlighted, however, that the variables described (time, current, tension, etc.) are merely illustrative and applicable in function of energy source and of the inductive load have be fed and controlled. For specific applications, a technician in the art is able to do the necessary alterations without departing from the scope of the invention.

As a result of the above description, it is evident that the system, object of present invention, is very versatile, as well as allowing a feeding and an efficient control, of the inductive load by this feed.

The electric power source can be constituted by one or more solar cells, one or more aeolic generators, one or more generators coupled to water wheels, as well as other similar systems, whose main characteristic is the inconstancy in the supplied useful power. Such essential characteristics of the invention aim to enlarge the functional range, mostly of the electric generators based on natural resources, whose utilization comes disseminating quickly. In another accomplishment form, the generator of electricity source can be of chemical action, by cells or batteries. In more another accomplishment form, the generator source of electricity can be by induction, as by generators or dynamos, coupled to hydraulic turbines or to other energy that makes its activation possible.

On the other hand, the load to be fed and controlled by the system, in function of the constitution of the resonant circuit RCL, should obligatorily be an inductive load, as the vibratory pump above exemplified. It should be clear, however, that other loads can be fed by the present inventive system, since they present the same qualification.

Finally, the current control supplied for the load is accomplished by digital micro controller, which can be configured for each specific use, without changing the circuit. As a result, the system is adaptable for several applications, thus reducing production costs in scale function. Moreso, the load feeding control is very efficient and is achieved by the system variables control, i.e. time of capacitor load, the source voltage level and the current level of the inductive load. Based on these variables, the micro controller fits itself as to keep an optimized condition whatever the useful power supplied by the energy source and the load use condition. In addition, the digital micro controller also provides protection to the system, in a dependent form, from a mosfet-type switch of low energy loss, which completely turns off the energy for the SCR.

What is claimed is:

1. A feeding system for an inductive load from a variable power energy source, that converts into spaced pulses of constant energy the DC power supplied by the energy source, wherein the feeding system does not use batteries and comprises a bridge circuit in communication with the energy source, a digital micro controller for controlling the bridge circuit as a function of system variables, and wherein the output/load of said bridge circuit comprises a resonant RCL series circuit, in which the RCL's inductance is the inductive load itself.

2. The system, according to claim 1, wherein an interface between the energy source and the inductive load is performed by an actuation module, which comprises:
   a capacitor bank, fed by the energy source;
   the actuation module also comprising:
   a bridge circuit disposed between the capacitor bank and a key;
   a digital micro controller, for controlling the bridge circuit, based on the system variables; and
   a resonant RCL series circuit, comprising a resistance, a capacitor and the inductive load.

3. The system, according to claim 2, wherein the system variables comprise: voltage supplied by the energy source, measured by a voltage sensor; current in the inductive load measured by a current sensor; and load time of a capacitor.

4. The system, according to claim 2, wherein the micro controller acts on the bridge circuit through actuators.

5. The system, according to claim 2, wherein a mosfet-type switch (poMFET) of low energy loss, which is placed between said digital micro controller and the key, so as to completely turn off the energy of the key, is provided.

6. The system, according to claim 1, wherein the energy source comprises one or more solar cells.

7. The system, according to claim 1, wherein the energy source (2) comprises one or more aeolic generators.

8. The system, according to claim 1, wherein the inductive load comprises one or more vibratory pumps.

9. The system, according to claim 1, wherein the energy source (2) comprises electricity generation by magnetic induction.

10. The system, according to claim 1, wherein the energy source (2) comprises electricity generation produced by chemical action.

11. A feeding system for delivering energy from solar cells to a vibratory pump, that converts into spaced pulses of constant energy, the DC power supplied by the solar cells, wherein the feeding system comprises an actuation module as an interface between the energy source and the inductive load, the actuation module comprising:
   a capacitor bank, fed by the solar cells;
   a bridge circuit disposed between the capacitor bank and a key;
   a resonant RCL series circuit, comprising a resistance, a capacitor and the inductive load; and
   a digital micro controller, that controls the bridge circuit, based on the system variables;
   wherein the system variables comprise:
      voltage supplied by the solar cells, measured by a voltage sensor;
      current in the inductive load measured by a current sensor; and
      load time of the capacitor.

12. The system, according to claim 11, wherein the micro controller acts on the bridge circuit through actuators.

13. The system, according to claim 11, wherein the digital micro controller also provides protection to the system from a mosfet type key (poMFET) of low energy loss, which is disposed between the digital micro controller and the key, so as to completely turn off the energy of the key.

\* \* \* \* \*